Dec. 31, 1957  C. B. FRANCIS  2,818,247
STEEL MAKING APPARATUS
Filed Aug. 14, 1953  2 Sheets-Sheet 1

INVENTOR
Charles B. Francis

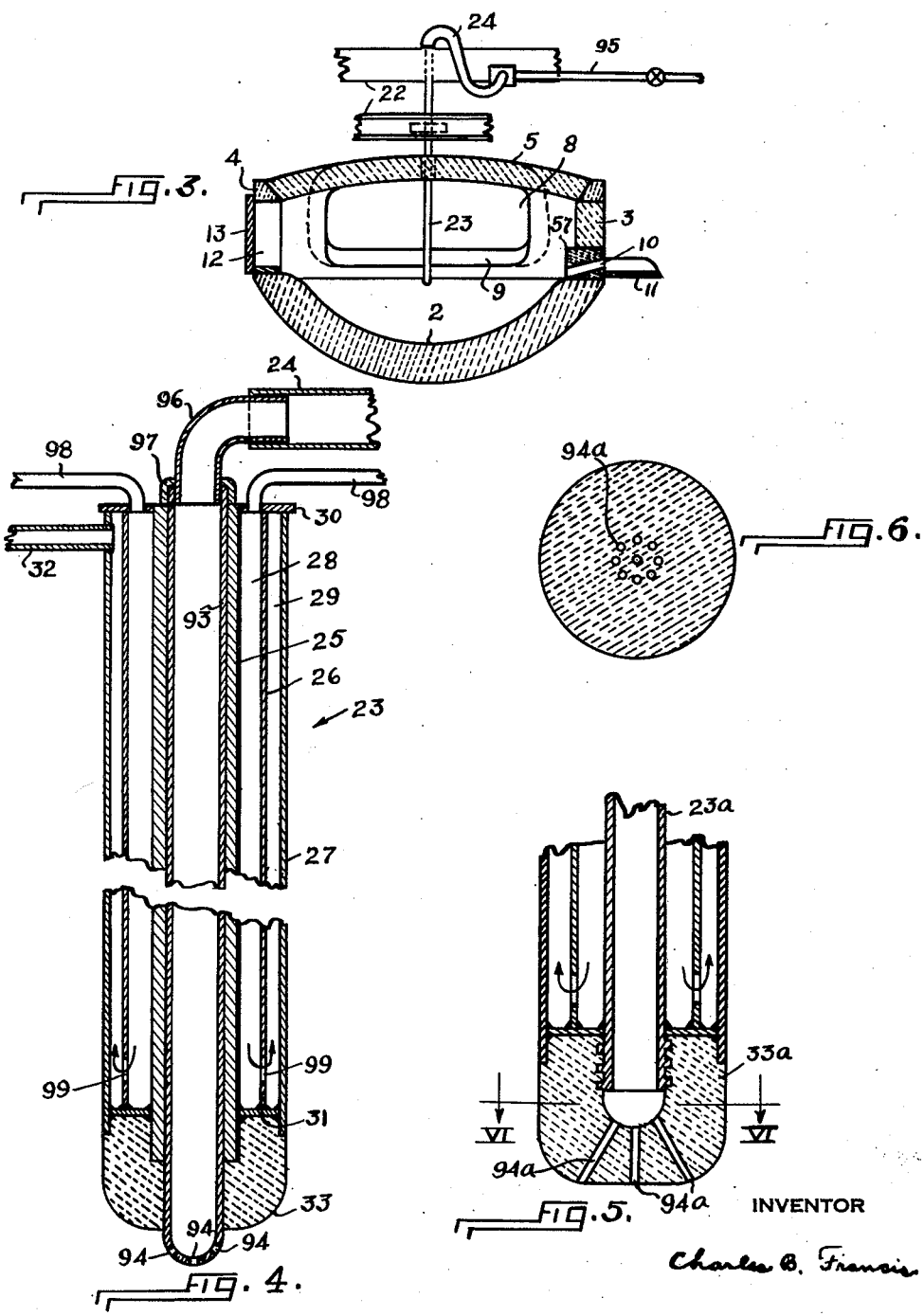

United States Patent Office 2,818,247
Patented Dec. 31, 1957

2,818,247

STEEL MAKING APPARATUS

Charles B. Francis, Pittsburgh, Pa.

Application August 14, 1953, Serial No. 374,187

8 Claims. (Cl. 266—35)

This invention relates to steel-making and consists in certain new and useful improvements both in method and apparatus therefor, wherein oxygen and a flux are principally used for the conversion of molten pig iron, or a mixture of molten pig iron and scrap, to steel.

Aside from the little-used cementation and crucible processes, the methods of making steel are known as the pneumatic, open hearth and electric furnace processes. Each of these processes are modified by the terms acid and basic, indicative of the chemical nature of the fluxes and/or the linings of containers or furnaces used in the production of steel. Some of these processes are also commonly known by the names of the inventors thereof. Thus, the acid-pneumatic practice is commonly called the Bessemer process, the basic-pneumatic practice—the Thomas process, and the acid-open-hearth practice—the Siemens process. The chief difference between the basic and the acid processes is that the former removes phosphorus from the metal while the latter does not.

In the United States, the chief steel-making processes used are the Bessemer, the basic open hearth, and the acid and/or basic electric furnace processes, for the following reasons:

First, the iron ores available are chiefly of two grades, classified as Bessemer and basic. The Bessemer ores are those suitable for making Bessemer pig iron, which is low in phosphorus (under 0.09%) and contains less than 1.00% manganese, while the basic ores are suitable for making pig iron that can be converted readily into steel by the basic-open-hearth process and may contain 0.1 to 0.9% phosphorus and 0.4 to 3.0% manganese.

Second, a large amount of steel scrap is available.

In the Bessemer process the molten pig iron is converted into steel by blowing air through it in a converter. The oxygen of the air, blown through the bottom of the converter, reacts exothermally with the silicon, manganese, carbon and some of the iron in the molten pig iron charged into the converter, thereby forming carbon monoxide, which escapes as a gas, and the lower oxides of the other elements, which combine with each other and some of the lining of the converter to form a slag, leaving almost pure iron which is poured into a ladle and converted to steel by adding ferro manganese, and other elements, as desired. The process requires no fuel and is very rapid, a blow seldom lasting more than 15 minutes. The heat in excess of that required to keep the iron molten varies with the silicon in the pig iron, but is generally sufficient to permit the addition of from 10 to 15% scrap to the charge. The yield of steel is about 90% of the total weight of the charge, so that a 25-ton converter is capable of producing about 80 tons of steel per hour, or a total of 1930 tons per 24-hour day, as compared with a total of 750 tons obtained per day with a 250 ton basic open hearth. Such an open hearth costs three times as much to build as a Bessemer converter. As already mentioned the Bessemer process is restricted to the use of one grade of iron.

The cardinal objects of the present invention are to provide a process and apparatus that will be as fast as the Bessemer, that will cost less to build and operate per ton of product, that will permit the consumption of more scrap, that will give a greater yield, and that will provide for the use of the several commercial grades of pig iron.

In the basic-open-hearth process iron ore and limestone are first charged into a fuel fired open hearth furnace; then scrap iron and steel are charged, usually in quantities of from 30 to 50% of the total metallic charge. The balance of the charge, consisting of pig iron, generally in the molten state, is added after the scrap has been heated to a point near the melting range. When the scrap has been melted, the iron ore reacts with the silicon, manganese, carbon and phosphorus in the bath to form the lower oxides of these elements, while the limestone slowly decomposes to form carbon dioxide and calcium oxide, the latter acting as a basic flux to combine with the acidic oxides of silicon and phosphorus and form a slag composed of calcium silicate and phosphate and the lower oxides of iron and manganese. Usually, at this point a large part of the slag formed is tapped, or allowed to "run off" from the furnace, to carry out most of the phosphorus and make it easier to raise the temperature of the metal. At this point the metal contains about 2.4% carbon, .01 to .05% manganese, .015 to .06% phosphorus, and .04 to .06% silicon, while the slag will consist of from 20 to 25% silica, from 22 to 40% iron oxides, from 8 to 18% manganese oxide, from 12 to 18% calcium oxide, and from 4 to 12% magnesium oxide derived from the calcined dolomite used to build up the banks of the furnace. The time required to reach this stage varies from 3½ to 4 hours, and about 4 hours more are required to work the carbon down and raise the temperature of the bath to the tapping point, about 150° F. about the melting point of iron. With a sulfur-free fuel some of the sulfur in the charge may be eliminated, if the manganese in the charge is on the high side. The fuel consumed varies from 3,000 to 5,000 cu. ft. of natural gas (3,000,000 to 5,000,000 B. t. u.) per ton of steel produced, or the equivalent of other gaseous or liquid fuel, which is four to five times that actually required for the metallurgical and chemical reactions. The heating efficiency of the furnace, therefore, is about 22%, and the yield of steel seldom exceeds 85% of the metallic content of the charge.

Regarding the growing use of oxygen in the production and refining of steel; oxygen containing not more than 1% nitrogen can now be produced in large quantities from air by the low pressure process for $5.00 to $10.00 per ton. In the United States oxygen has been used to enrich the blast to the blast furnace, but not to the Bessemer converter. In the open hearth oxygen has been used to enrich the air used for combustion, and also oxygen has been used to reduce the carbon and raise the temperature of the bath or charge of molten metal by lancing, that is, by introducing the oxygen through a steel tube, the open end of which is held at or just below the surface of the molten metal. It has also been used in a similar manner and for the same purposes in the electric furnace processes.

In India, pig iron is converted to steel by charging it into a 30-ton Thomas (basic) converter without tuyeres, adding from 10 to 15% scrap, and treating the metal from 20 to 25 minutes with oxygen introduced through a water-cooled lance lowered through the top of the converter. In Austria, steel is being made by a similar process, but it seems that the oxygen is introduced through a water-cooled copper tipped tuyere. In England, smaller side blown converters are used and the oxygen is introduced through the tuyeres regularly used for air. Oxygen consumed by these methods varies from 2400 to 2500 cu. ft. (200 lbs. minimum) per ton of steel produced.

An objection to these apparatus and methods is the large amount of fumes produced, which approaches 400 lbs. per ton of metal, and exceeds the quantity of fumes produced by the Bessemer process.

A further object of my invention is to reduce the amount of fumes formed in the production and refinement of steel, and to recover at least 70% of the fumes which are formed.

Still a further object of my invention is to develop a process and apparatus representing an improvement over the known methods of using oxygen, while retaining all the advantages of the basic open-hearth and electric furnace processes, with few or none of the disadvantages of either process.

And yet another object of the invention is to minimize plant and operating costs of making specified steels.

The conservation of manganese also is an aim of the invention. As is well known, the United States has very little naturally occurring manganese ore suitable for making ferro-manganese. About 5,500,000 net tons of ferro-manganese (worth about $110,000,000.00) is consumed annually by the iron and steel industry of the United States. Yet, as pointed out, the average manganese in the pig iron and scrap consumed is 3 to 4 times the manganese in the steel produced. In all of the oxidation processes of producing steel heretofore practically all of the manganese in the charge is wasted. In the process and apparatus of my present invention from one-fourth to one-half of the manganese in the charge may be recovered in the steel produced, making the addition of ferro-manganese unnecessary, except in the case of the higher manganese grades of steel.

The realization of these objects may be obtained in the practice of the method and in the use of the apparatus described in the following specification and illustrated in the accompanying drawings, in which:

Fig. 3 is a view in medial, transverse, vertical section of the converter, as seen on the plane III—III of Fig. 1;

Fig. 4 is a view to larger scale, illustrating fragmentarily and in vertical section one of the oxygen-injecting tubes that may be used in the operation of my converter;

Fig. 5 is a fragmentary sectional view of a modified form of oxygen-injecting tube; and Fig. 6 is a view of the latter tube in cross section, as seen on the plane VI—VI of Fig. 5.

Figure 1:
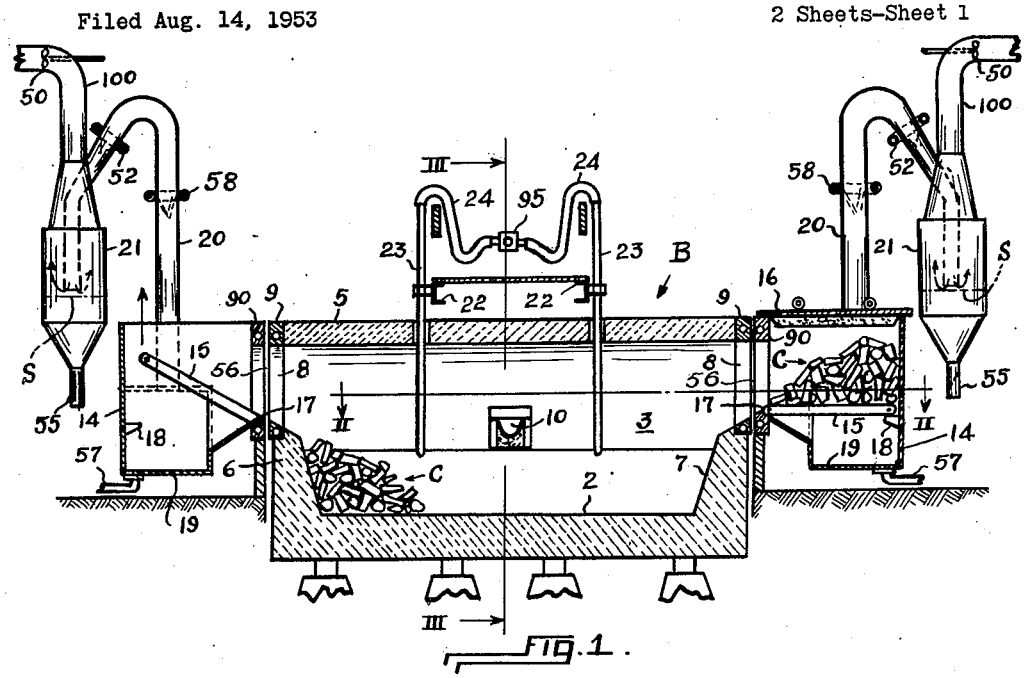
Fig. 1 is a view longitudinal, vertical cross section of a converter embodying the invention. The view is taken on the plane I—I of Fig. 2, which plane is at a level 2 feet above the slag line of a converter that contains a maximum charge of 75 net tons in the molten state.
Figure 2:
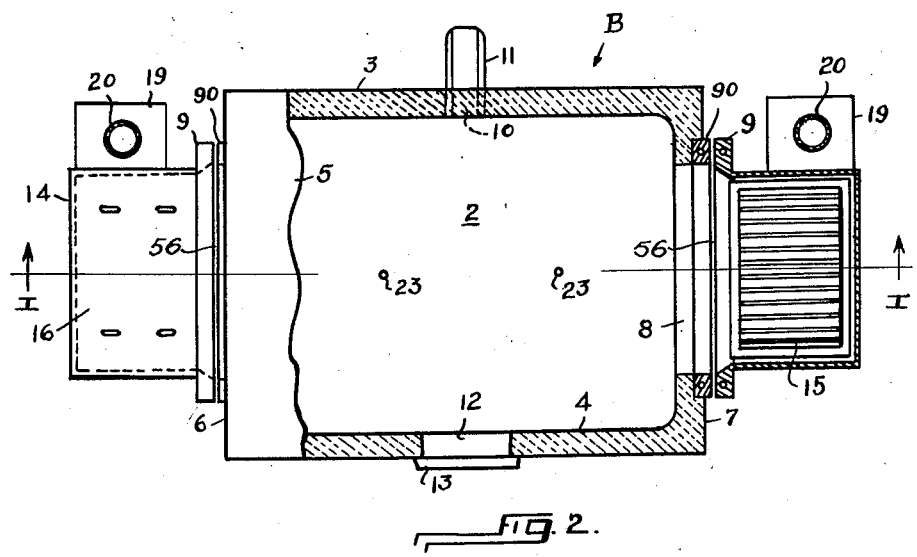
Fig. 2 is a view of the converter partly in top elevation and partly in horizontal cross section on the plane II—II of Fig. 1.

Referring to Figs. 1 to 3 of the drawings, the converter of my invention may comprise the body B of a tilting open hearth furnace, having a dished hearth 2, back and front walls 3 and 4, respectively, a roof 5 and end walls 6 and 7, all constructed of suitable refractories. The end walls 6 and 7 each include a port 8 located within the compass of a water-cooled frame 9 of metal. The back wall includes a tap-hole 10, with which a tapping trough 11 is organized, while a doorway 12 is provided in the front wall, the doorway being normally closed with a door 13. The refractory body of the furnace is externally supported, reinforced and tied by means of steel plate, beams, buckstays, and iron or steel castings after the well-known manner that the conventional open-hearth tilting furnace is constructed, and it is needless to involve this specification with such details that do not go to the heart of the present invention. Suffice it to say that the furnace body B may be constructed in substantially the same way as the usual and well-known tilting open hearth furnaces are constructed, and mounted to be turned or tilted, by means of a known sort of mechanism (not shown), on the longitudinal axis of the furnace body.

Whereas in conventional open hearth furnaces the ports 8 at the opposite ends of the furnace chamber communicate through downwardly extending passages with checker chambers and flues leading to a stack and to an inlet for combustion air, in the converter of my invention scrap-preheating chambers 14 are provided. The chambers 14 may be constructed of heavy steel plate, and each chamber includes a water-cooled frame 90 that matches the port ring or frame 9 at the adjacent end of the furnace, whereby, when the furnace is in normal (untilted) operating position, open communication is provided from within the converter body B into the chambers 14. In each chamber 14 a gate 15 is mounted at a suitable interval below removable insulated roofs or covers 16 of the chambers, to permit charges C of scrap iron and steel to be supported upon the grate. Each grate 15 is pivotally mounted at its edge 17 upon the horizontal bottom limb of the adjacent water-cooled frame 90, while the opposite or remote edge of each grate is supported upon seats 18 rigid with walls of chambers 14. In service position the grates 15 extend horizontal, as illustrated on the right-hand end of the apparatus in Fig. 1, with a full charge of strap C borne upon the grates beneath the covers 16. From beneath each grate 15 a flue-box 19 extends outwardly, and from such flue-boxes a duct 20 extends first upwardly and then downwardly into a gas cleaner 21, later to be described in further detail.

The refractory body B of the converter may be either acid or basic, according to the grade of pig iron to be converted.

Projecting through the roof 5 of the converter are two oxygen-injecting tubes 23. The tubes 23 are supported for vertical adjustment by certain members 22 of the steel superstructure of the furnace body B. The particular mechanism for the adjustment of the tubes 23 is a matter of engineering skill wherefore such mechanism is not illustrated. The number of the oxygen-injecting tubes will vary with the size or area of the hearth 2 of the converter, and in the illustrated case, where the converter has a 75-ton hearth, the two tubes 23 shown will suffice. The particular construction of the tubes is, however, of importance.

Referring to Fig. 5, each tube 23 comprises an assembly having an inner steel tube 93 of one inch in diameter. The tube 93 is closed at its lower end, save that a plurality of ⅛ inch holes 94 are provided therein, the pattern of the holes may be such as the pattern of the holes 94a in Fig. 6. The open upper end of tube 93 is connected to a flexible hose 24 leading to an oxygen supply line, not shown, the connection between the tube 93 and the hose comprising an elbow 96 united to the said tube by means of a coupling 97. Snugly fitting the tube 93 is a heavy-walled, water-cooled sleeve 25; spaced from and surrounding sleeve 25 is a steel pipe 26, and spaced from pipe 26 is an outer casing 27 also formed of steel pipe. The sleeve 25 and pipes 26 and 27 are united by means of header plates 30 and 31, and beneath header plate 31 a refractory snout 33 is secured in the assembly, as shown. The composition of the refractory material of which the snout is formed may comprise a high alumina (over 70%) brick, although a chromite, or magnesite, or fosterite brick may be used where the converter processes basic iron. Where Bessemer iron is processed the snout 33 should be formed of silica or chromite brick.

As will presently appear, the lower end of the tube assembly 23 is lowered into or almost into contact with the bath of molten metal lying beneath a blanket of slag in the converter, and it will be understood that the refractory snout 33 serves to prevent the slag from making contact with cold ends of tube and pipe portions 25, 26 and 27, while the snout itself becomes hot while in contact with the bath and prevents the solidification and "balling" of slag upon the end of the injector tube assembly.

The metal body of the tube assembly is water cooled. Four water inlet pipes 98 (two only appear in the drawings) open at uniformly spaced points through the header plate 30 into the annular space 28 formed between members 25 and 26, whereby incoming cool water is directed downwardly in space 28 and in intimate contact with the surface of sleeve 25. Adjacent to the bottom of the tube assembly a peripheral series of ¼ inch holes open through the pipe 26, whereby the cooling water enters the space 29 between pipes 26 and 27. Rising through the latter space the water is led away through an outlet line 32. A very effective and uniform distribution of flow of the cooling water is thus obtained to guard the tube assembly from the ravage of service temperatures.

It may be noted that the system of orifices 94 in the lower end of the oxygen-delivering tube 93 serve to effect a more distributed flow of oxygen into the molten metal than may be obtained with the lower end of the tube open and unrestricted. The system of small orifices 94 effect the delivery of oxygen at higher velocity, causing the jets of oxygen to repel or blow-back slag and to penetrate the metal below the slag a greater distance, thereby insuring that the oxygen will not all be absorbed by the iron immediately below the slag.

A modification of the oxygen-injecting tube structure is illustrated in Figs. 5 and 6, where it will be seen that the inner tube 23a is not continued downwardly through the refractory snout 33a, and the sleeve 25 of the structure of Fig. 4 is omitted. The snout 33a is preferably formed of bauxite or a high alumina brick composition, since chromite and magnesite tips have a tendency to spall. The oxygen-jetting orifices 94a of this modified tube are formed in the body of the refractory snout, rather than in the end of the oxygen delivering tube shown in Fig. 4.

Turning now to a detailed consideration of the practice of my invention, it may be noted that when operation is started for the first time the refractory body of the converter is heated to a red heat, by means of a fuel gas delivered by burners projected through the doorway 12 and tap-hole 10. Also, the tube assemblies 23 may be temporarily employed as burners, and fuel gas may be delivered therethrough into the converter chamber until the initial heating up of the converter body is accomplished.

Either before or during the heating up of the converter, scrap is charged into the chambers 14, by means of an electro-magnet carried by an overhead charging crane. Alternatively, the scrap may be charged by means of drop-bottom buckets of the sort commonly used in charging electric arc furnaces. When both chambers 14 have been fully charged with scrap C, as indicated in the case of the right-hand chamber 14 in Fig. 1, the covers 16 of the chambers are positioned or closed upon the tops of the chambers, which, of course, were uncovered during the scrap-charging operation.

It may be mentioned that the scrap charged may be pieces varying from one to eight feet in length, charged so that the pieces extend lengthwise across the grates 15. Mill scrap consisting of the cropped ends of blooms, billets, bars, shapes, plates and hot rolled strip is ideal for the purpose. For a converter designed to process a 60-ton heat, the scrap chambers 14 are designed to hold at least twelve tons each of scrap, or 40% of the total metallic charge of the heat, this being 5% more than the average scrap ratio employed in basic open hearth furnaces.

When the fuel burners have been lighted, motor-driven fans 50 are set in operation in the stack ducts leading from the gas-cooling and cleaning units 21, and the products of combustion or waste gases are drawn through the ports 8 at the opposite ends of the converter, through the interstices in the scrap charges C and grates 15 and into the flue-boxes 19 therebelow, whence the waste gases flow upward through ducts 20 into units 21 and thence through flues 100 to stack or other outlet. During this time jets of cooling water are delivered by sprays 52 into the waste gases flowing into the cleaning units 21.

When the converter body has been heated to desired temperature, the burners are removed from doorway 12 and tap-hole 10, and the tube assemblies are disconnected from the fuel gas supply and connected to the oxygen supply line 95, Fig. 1.

The same crane as was used in charging the scrap C now serves to bring a ladle containing 36 tons of molten pig iron to the converter, whereupon the molten metal is poured through a spout of conventional design inserted through the doorway 12 of the converter, with the oxygen injecting tubes raised as high as possible. Upon the charging of the molten metal into the converter and the removal of the pouring spout, the injecting tubes 23 are lowered to within an inch of the surface of the metal, the door 13 is closed, the oxygen is turned on, and the tubes are lowered until their tips are immersed in the molten iron. After a period of from five to six minutes about 1500 lbs. of burned lime (quick lime) is charged in three lots through the doorway to combine with all the oxides of the silicon and phosphorus in the pig iron. At this time the slag layer is about one inch thick and the injecting tubes are lowered to bring the tip below the slag. Ten minutes after all the lime has been added, the slag layer is about two inches thick, and the injecting tube is lowered accordingly, then kept stationary to the finish of the heat.

The reactions that occur during the working of a heat and the quantity of each product formed are found as follows:

Hot metal charged=3600 net tons=72,000 lbs.

| Element | Silicon | Manganese | Sulfur | Phosphorus | Carbon |
| --- | --- | --- | --- | --- | --- |
| Composition: | | | | | |
| Percent | 1.00 | 1.50 | 0.05 | 0.100 | 4.25 |
| Lbs | 720.00 | 1,080.0 | 36.0 | 72.0 | 3,060.0 |
| Heat Liberated, B. t. u. | 9,072,000 | 3,132 | | 763,992 | 10,324,440 |

Total heat liberated=20,163,564 B. t. u.

The oxygen injected reacts with each of the elements, with the following net results:

1. $\underset{720\#}{Si} + \underset{823\#}{O_2} \longrightarrow SiO_2 + 198.3$ kilo Cal=12,600 B. t. u./lb .fused 2. $\underset{1080\#}{Mn} + \underset{309\#}{\tfrac{1}{2}O_2} \longrightarrow MnO + 90.8$ kilo Cal=2.9 B. t. u./lb. fused 3. $\underset{72\#}{2P} + \underset{93\#}{2\tfrac{1}{2}O_2} \longrightarrow P_2O_5 + 365.8$ kilo Cal=10611 B. t. u./lb. fused 4. $\underset{3060\#}{C} + \underset{4080\#}{+\tfrac{1}{2}O_2} \longrightarrow \underset{7140}{CO} + 26.4$ kilo Cal=3374 B. t. u./lb. fused 5. $\underset{1440\#}{Fe} + \underset{411\#}{\tfrac{1}{2}O_2} \longrightarrow FeO + 65.7$ kilo Cal=2.1 B. t. u./lb. fused The above reactions show not only the heat produced but also the minimum weight of oxygen required to oxidize the elements, which amounts to 5716 lbs., or approximately 64,146 cu. ft. Actually, a minimum of 90,000 cu. ft. (8100 lbs.) is used per heat. Assuming that 2% or 1440 lbs. of iron is oxidized, reaction 5 gives a total of 30,240 B. t. u., which added to the total heat liberated by other elements oxidized, gives a grand total of 20,193,804 B. t. u. Of this total about 15% (3,029,070 B. t. u.) is lost by radiation from the vessel and at least 81,000 B. t. u. is absorbed by the lime added. About 900,000 B. t. u. is absorbed by the vessel itself and 8,064,000 B. t. u. is required to raise the temperature of the metal from 2200° F. to 2900° F. for a total of 12,074,000 B. t. u., leaving a balance of 8,119,804 B. t. u. to be carried out through the scrap boxes by the CO gas generated. This is about twice as much heat as the gas can carry if it escapes at 3300° F., and evidence that it does escape at a very high temperature is the iron and manganese fume it carries, manganese boiling at 3450° F. By feeding the oxygen at a comparatively slow rate, the quantity of this fume is reduced to about 200 lbs. per ton, or a total of 7200 lbs. per heat. Assuming that this fume escapes from the vessel at 3300° F., and that it has a heat content of 600 B. t. u. per lb., the total heat carried out by the fume during a heat is 4,320,000 B. t. u. which added to the heat content of the gas, 3,786,750 B. t. u. gives a total of 8,106,750 B. t. u., balancing the 8,119,804 B. t. u. given above fairly closely. Assuming that the gas and fume is cooled to 1,000° F. in passing through the scrap pile, the heat lost by the gas is 2,628,100 B. t. u. and that lost by the fume is 2,880,000 B. t. u., making a total of 5,508,100 B. t. u., sufficient to raise the temperature of the scrap to $$860° F. \frac{(5508100)}{6400}$$

However, the scrap is actually heated to a much higher temperature, usually to between 1200° F. and 1300° F., because the stack fans 50, draw much air into the scrap box through the 1.5 to 2 inch air gap 56, between the box and the conversion vessel, and the combustion of the CO liberates a little more than three times as much heat as was formed by the reaction of oxygen with carbon to form CO, or about 33,660,000 B. t. u. However, more than three-fourths of this heat is absorbed by the nitrogen and excess air drawn through the gap, leaving about 5,000,000 B. t. u. to be absorbed by the scrap. If the box is operated dry or should go dry and reach a dull red heat any time during the working of a heat, it is cooled rapidly by turning off the oxygen. The temperature of the scrap boxes may be controlled also by increasing or decreasing the speed of the stack fans.

The first heat is tapped about twenty-five minutes after starting the injection of oxygen. The tapping of the heat is accomplished by tilting the vessel forward and causing the metal to flow out of the spout 11 into a suitable steel ladle.

It will be noted in Fig. 3 that the tap-hole 10 is so arranged in the tapping block 57 as to permit only metal in the tapping block to flow to the spout 11 and ladle (not shown) when the converter is progressively tilted, until the tilting has reached its maximum angle of tilt and all of the metal has run out of the converter, whereafter the slag follows. During the tapping operation finishing additions, except manganese, are added as usual when the ladle is about one-third full and before the slag flows to form a blanket over the molten metal.

While reaction "2" in the foregoing context shows manganese as being oxidized, this applies only to the first period of the working of the heat, during which the weak basic iron and manganese oxides formed combine with the oxides of silicon and phosphorus to form a slag. With the addition of sufficient lime the iron and manganese oxides are replaced by the strongly basic calcium oxide, liberating the oxides of iron and manganese which are reduced by the carbon remaining in the bath. The iron is constantly being oxidized to FeO by the oxygen. The FeO being soluble in the metal reacts with carbon and any silicon remaining, and tends to react with manganese thus:

(6) 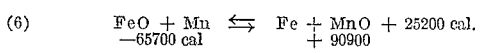

But at high temperatures, such as attained at the end of the working of a heat, this reaction becomes reversible, and manganese up to the equilibrium point is reduced. So, with a high manganese pig iron (1.5% or more), the equilibrium point is reached with about 0.40% manganese in the metal. Sulphur is also eliminated from the metal through the action of manganese, being reduced from about 0.05% to between 0.01 and 0.02%.

After the first heat of processed molten pig iron is tapped, this operation of the converter involves a series of operations that are substantially routine for all succeeding heats, which may be briefly described as follows:

First, the covers are removed from the scrap chambers, and the scrap they contain, having been preheated by the hot waste gases developed by the processing of the preceding heat to say 1200° F., is dumped into the ends of the hearth 2, as indicated at the left-hand end of the converter body in Fig. 1. The transfer of the scrap charges C from the chambers 14 into the converter body is effected by means of the overhead charging crane which tilts the grates 15 and causes the scrap charges to slide into the ends of the converter. Time required—2 minutes.

(2) The crane then brings a ladle of hot metal (38 tons) and pours the metal into the converter as hot metal is poured into an open hearth. Time required—5 minutes.

(3) The crane next charges cold scrap in two lots of 11 tons each, into the chambers 14, which scrap is to be heated for the next heat of steel to be produced in the converter. The injecting tubes are adjusted at this stage of the operation. Time required—4 minutes.

(4) The scrap box covers are replaced and the oxygen is turned into the tubes 23. Time required—1 minute.

(5) About 6 minutes later, 500 lbs. of lime is charged into the converter, and 1,000 lbs. are gradually added during the next 5 minutes.

(6) During the next 10 minutes, oxygen is injected at a moderate but constant rate, and analysis tests of the metal are made in this period.

(7) The vessel is tilted and the refined steel is tapped into the steel ladle, to give a heat of approximately 60 tons of steel. Time required for tapping—4 minutes. Total elapsed time—37 minutes. Minimum time for oxidation—21 minutes, probably increased to 24 minutes, making the time from tap to tap about 40 minutes.

It will be noted that, whereas 36 tons of hot metal was used in the first heat with 12 tons of scrap in each of the two scrap boxes, 38 tons of hot metal is charged for the second heat with 10 tons of scrap in each of the scrap boxes to be preheated for the third heat. The reason for this change is explained by the fact that the 24 tons of scrap preheated to 1200° F. will require approximately 19,200,000 B. t. u. (1400 B. t. u. by 48,000 lbs.) to melt it and raise its temperature to 2900° F. This amount of heat is nearly equal to the total heat generated in the oxidation of the first heat of 36 tons, and about twice that available for heating the 24 tons of scrap. However, very little, if any, heat is absorbed by the vessel during the second heat, and, by increasing the hot metal to 38 tons, the heat generated is increased to a little more than 21,316,000 B. t. u., and, by decreasing the total scrap charged from 22 to 20 tons, the heat required to raise its temperature to 1200° F. is decreased 5%. Thus, the heat generated in the oxidation of the 38 tons of pig iron, plus that from combustion of the CO formed is sufficient to heat the 20 tons of scrap to a temperature of 1,000° F. or more. Air for combustion of the CO is admitted to the gas streaming from the converter chamber by way of the clearances provided between the water-cooled frames 9 and 90.

For the third and each succeeding heat the hot metal charged is increased to 45 tons, but no change is made in the weight of scrap charged. The oxidation period is maintained between 23 and 24 minutes to produce 60 tons, or more, of finished steel every 40 minutes. This gives a production rate of 90 tons per hour, or an output of 2160 tons for a 24-hour day. By premelting scrap in a fuel fired furnace and adding 15 tons of the molten scrap to the bath just before tapping the heat, the output may be increased to 75 tons per heat, which equals 112.5 tons per hour, or 2700 tons per day. Greater production from an installation can be obtained by increasing the size or capacity of the converter.

It will be observed that the schedule provides no time for building up the banks of the hearth and side walls of the converter, as is necessary in the open hearth processes. This is an operation not normally required in the practice of the present invention, particularly if the usual two or three courses of chrome brick are used to separate the magnesite brick from the silica brick in the walls of the converter body. The side walls and roof of the converter are subjected to less heat and erosion than in those of the conventional open hearth furnace, because the heat is generated within the bath, not above it. The oxygen injecting tubes 23 are located on the longitudinal centerline of the converter, midway between the tap hole 10 and the ends 6 and 7. The scrap is delivered into the converter which lies at each end near the oxygen injecting tubes. As thus located adjacent to the oxygen injecting tubes, the scrap rapidly absorbs heat until it is all melted, and thus reduces the quantity of fumes produced, since the molten metal is maintained at a lower temperature than otherwise would be the case. Also, with injecting tubes thus located, the small jets of oxygen at the ends of the injecting tubes spreads the oxygen and prevents splashing the walls and the roof of the converter with slag. The addition of the lime gradually after the scrap is melted serves at first also to cool the bath, but later, when the lime has been converted to slag, it acts as a blanket against radiation heat losses and helps to raise the temperature of the bath rapidly to a point above 2950° F., at which time part of the manganese is reduced and the heat is ready to tap.

The gas and fumes are treated as follows: The bottoms of the flue-boxes 19 are kept covered with 2 to 3 inches of water introduced through the pipes 57, at a rate of about seven (7) gallons per minute through each pipe. All this water is vaporized and the generated gas, exciting through ports 8 and flowing downwardly through the scrap charges and grates 15, is cooled to about 400° F. The resultant mixture of gas and steam is drawn through the pipes 20, in which it is first sprayed with water at points 58 and cooled to about 210° F., and then sprayed at point 52 to cool it to about 180° F., producing a heavy fog. The gas and condensed water, the droplets of water now containing the fumes entrained in the gas, pass downwardly and impinge upon the surface S of a pool of water in each cleaner unit 21. The impingement of the gas keeps the surface of the water constantly agitated, further wetting the fumes, which form a thin sludge that settles through the still-water below the surface of the pool in the hopper-like bottom of the unit, whence it is drawn off through an outlet 55, at intervals, in the form of sludge that dries to a hard cake of iron and manganese oxides, which cakes may be treated for the recovery of both of these elements. Any fumes not removed settle rapidly with the entrained water forced out through the stack flues 100 by the fans 50.

In the practice of this invention steel can be produced at a lower cost than any of three processes in common use, and the steel produced by the invention is of as good quality as that produced by the basic open hearth process, since production conditions and the metallurgical reactions are more easily controlled than in the latter process. For example, the apparatus and process of the present invention permits the carbon to be "caught on the way down" with greater accuracy, in view of the fact that at any time after the lime has been added and changed into slag, carbon elimination may be completely stopped by lifting the injecting tubes 23 and turning off the oxygen while the bath is sampled and the sample analyzed and/or tested. As for cost, it is apparent that the labor required to produce 2160 tons of steel per day is less than one-third of that required to produce the same tonnage by the basic open hearth process, the comparison being made against 250-ton open hearths making three heats per day. To continue the comparison, the minimum fuel cost by the basic open hearth process, with natural gas at 52¢ per 1000 cu. ft. is $2.08 per ton, equivalent to 4,000,000 B. t. u., or 400 cu. ft. of natural gas per ton. In the use of the apparatus of the present invention the consumption of oxygen, allowing for 33⅓% waste over that normally required, amounts to 2000 cu. ft. or 1/12 ton of oxygen per ton of steel produced. Depending upon the size of the oxygen plant, this oxygen costs $8.00 to $10.00 per ton, making the cost per ton of steel $0.67 to $0.83. Many other advantages of the invention over the methods of the prior art will be apparent to those skilled in the art.

Having thus described the invention and cited an example of its application in sufficient detail to permit those skilled in the art to build the apparatus and practice the process, it is to be noted that many modifications and variations may be made without departing from the spirit of the invention defined in the following claims:

I claim:

1. Apparatus for the production of steel, a tilting converter chamber containing a mixed charge of molten pig iron and steel scrap, means for directing oxygen into said molten charge for refining the mixture of metals to molten steel, with the generation of heat and the liberation of hot fumes and gases, said converter chamber being tiltable from metal-refining position into position for discharging the refined steel therefrom, an outlet opening from said converter chamber for the escape of said hot fumes and gases, a scrap chamber having an inlet normally registering with the outlet of said converter chamber and having an outlet for fumes and gases, means for supporting a charge of scrap pervious to flow of the hot fumes and gases between the inlet and outlet of said scrap chamber, said outlet of the converter chamber being arranged to move into and out of registry with said inlet of the scrap chamber when the converter chamber is tilted between metal-refining and discharging positions, whereby communication between the converter chamber and the scrap chamber, interrupted where the converter chamber moves into discharging position, is re-established and the flow of hot fumes and gases from the converter chamber, through the scrap, and to the scrap-chamber outlet is restored when the converter chamber is moved from discharging to metal-refining position.

2. Apparatus for the production of steel, a tilting converter chamber containing a mixed charge of molten pig iron and steel scrap, means for directing oxygen into said molten charge for refining the mixture of metals to molten steel, with the generation of heat and the liberation of hot fumes and gases, said converter chamber being tiltable from metal-refining position into position for discharging the refined steel therefrom, an outlet opening from said converter chamber for the escape of said hot fumes and gases, a scrap chamber having an inlet normally registering with the outlet of said converter chamber and having an outlet for fumes and gases, means for supporting a charge of scrap pervious to flow of the hot fumes and gases between the inlet and outlet of said scrap chamber, said outlet of the converter chamber being arranged to move into and out of registry with said inlet of the scrap chamber when the converter chamber is tilted between metal-refining and discharging positions, whereby communication between the converter chamber and the scrap chamber, interrupted when the converter chamber moves into discharging position, is re-established and the flow of hot fumes and gases from the converter chamber, through the scrap, and to the scrap-chamber outlet is restored when the converter chamber is returned from discharging to metal-refining position, and means for transferring heated scrap from the scrap chamber to the converter chamber.

3. Apparatus for the production of steel, a tilting converter chamber containing a mixed charge of molten pig iron and steel scrap, means for directing oxygen into said molten charge for refining the mixture of metals to molten steel, with the generation of heat and the liberation of hot fumes and gases, said converter chamber being tiltable from metal-refining position into position for discharging the refined steel therefrom, an outlet opening from said converter chamber for the escape of said hot fumes and gases, a scrap chamber having an inlet normally registering with the outlet of said converter chamber and having an outlet for fumes and gases, means for supporting a charge of scrap pervious to flow of the hot fumes and gases between the inlet and outlet of said scrap chamber, said outlet of the converter chamber being arranged to move into and out of registry with said inlet of the scrap chamber when the converter chamber is tilted between metal-refining and discharging positions, whereby communication between the converter chamber and the scrap chamber, interrupted when the converter chamber moves into discharging position, is re-established and the flow of hot fumes and gases from the converter chamber, through the scrap, and to the scrap-chamber outlet is restored when the converter chamber is returned from discharging to metal-refining position, and means for transferring heated scrap from the scrap chamber to the converter chamber, together with means for cooling and cleansing the gases flowing from the outlet of said scrap chamber.

4. Apparatus for the production of steel, a tilting converter chamber containing a mixed charge of molten pig iron and steel scrap, means for directing oxygen into said molten charge for refining the mixture of metals to molten steel, with the generation of heat and the liberation of hot fumes and gases, said converter chamber being tiltable from metal-refining position into position for discharging the refined steel therefrom, an outlet opening from said converter chamber for the escape of said hot fumes and gases, a scrap chamber having an inlet normally registering with the outlet of said converter chamber and having an outlet for fumes and gases, a tilting grate for supporting a charge of scrap in the line of flow of the hot fumes and gases between the inlet and outlet of said scrap chamber, said outlet of the converter chamber being arranged to move into and out of registry with said inlet of the scrap chamber when the converter chamber is tilted between metal-refining and discharging positions, whereby communication between the converter chamber and the scrap chamber, interrupted when the converter chamber moves into discharging position, is re-established and the flow of hot fumes and gases from the converter chamber, through the scrap, and to the scrap-chamber outlet is restored when the converter chamber is returned from discharging to metal-refining position, and means for tilting said scrap-supporting grate and effecting the transfer of heated scrap therefrom and into the converter chamber.

5. Apparatus for the production of steel, a tilting converter chamber containing a mixed charge of molten pig iron and steel scrap, means for directing oxygen into said molten charge for refining the mixture of metals to molten steel, with the generation of heat and the liberation of hot fumes and gases, two outlets opening through opposite walls of said converter chamber, two scrap chambers having inlets normally registering severally with said outlets of the converter chamber and each having an outlet for fumes and gases, and means in each scrap chamber for supporting a charge of scrap pervious to the flow of the hot fumes and gases between the inlet and outlet of such chamber, said outlets of the converter chamber being arranged to move into and out of registry with said inlets of the scrap chambers when the converter chamber is tilted between metal-refining and discharging position, whereby communication between the converter chamber and the scrap chambers, interrupted when the converter chamber moves into discharging position, is re-established and the flow of hot fumes and gases from the converter chamber, through the scrap charges, and to the scrap-chamber outlets is restored when the converter chamber is returned from discharging to metal-refining position.

6. Apparatus for the production of steel, a tilting converter chamber containing a mixed charge of molten pig iron and steel scrap, means for directing oxygen into said molten charge for refining the mixture of metals to molten steel, with the generation of heat and the liberation of hot fumes and gases, two outlets opening through opposite walls of said converter chamber, two scrap chambers having inlets normally registering severally with said outlets of the converter chamber and each scrap chamber having an outlet for fumes and gases, and means in each scrap chamber for supporting a charge of scrap pervious to the flow of the hot fumes and gases between the inlet and outlet of such chamber, said outlets of the converter chamber being arranged to move into and out of registry with said inlets of the scrap chambers when the converter chamber is tilted between metal-refining and discharging positions, whereby communication between the converter chamber and the scrap chambers, interrupted when the converter chamber moves into discharging position, is re-established and the flow of hot fumes and gases from the converter chamber, through the scrap charges, and to the scrap-chamber outlets is restored when the converter chamber is returned from discharging to metal-refining position, together with means for transferring heated scrap from the scrap chambers to the converter chamber.

7. Apparatus for the production of steel, a tilting converter chamber containing a mixed charge of molten pig iron and steel scrap, means for directing oxygen into said molten charge for refining the mixture of metals to molten steel, with the generation of heat and the liberation of hot fumes and gases, two outlets opening through opposite walls of said converter chamber, two scrap chambers having inlets normally registering severally with said outlets of the converter chamber and each scrap chamber having an outlet for fumes and gases, and means in each scrap chamber for supporting a charge of scrap pervious to the flow of the hot fumes and gases between the inlet and outlet of such chamber, said outlets of the converter chamber being arranged to move into and out of registry with said inlets of the scrap chambers when the converter chamber is tilted between metal-refining and discharging positions, whereby communication between the converter chamber and the scrap chambers, interrupted when the converter chamber moves into discharging position, is re-established and the flow of hot fumes and gases from the converter chamber, through the scrap charges, and to the scrap-chamber outlets is restored when the converter chamber is returned from discharging to metal-refining position, together with means for cooling and cleansing the gases flowing from the outlets of said scrap chambers.

8. Apparatus for the production of steel, a tilting converter chamber containing a mixed charge of molten pig iron and steel scrap, means for directing oxygen into said molten charge for refining the mixture of metals to molten steel, with the generation of heat and the liberation of hot fumes and gases, two outlets opening through opposite walls of said converter chamber, two scrap chambers having inlets normally registering severally with said outlets of the converter chamber and each scrap chamber having an outlet for fumes and gases, a tilting grate in each scrap chamber for supporting scrap in the lines of flow of the hot fumes and gases between the inlets and outlets of said scrap chamber, said outlets of the converter chamber being arranged to move into and out of registry with said inlets of the scrap chambers when the converter chamber is tilted between metal-refining and discharging positions, whereby communication between the converter chamber and the scrap chambers, interrupted when the converter chamber moves into discharging position, is re-established and the flow of hot fumes and gases from the converter chamber, through the scrap charges, and to the scrap-chamber outlets is restored when the converter chamber is returned from discharging to metal-refining position, and means for tilting said scrap-supporting grates and effecting the transfer of heated scrap therefrom and into the converter chamber.

References Cited in the file of this patent

UNITED STATES PATENTS

| | | |
|---|---|---|
| 49,052 | Bessemer | July 25, 1865 |
| 145,843 | Carpenter, Jr. | Dec. 23, 1873 |
| 166,757 | Eustis | Aug. 17, 1875 |
| 227,339 | Williams | May 4, 1880 |
| 586,047 | Last et al. | July 6, 1897 |
| 754,159 | Potter | Mar. 8, 1904 |
| 2,515,631 | Chiswik | July 18, 1950 |
| 2,546,937 | Wyandt et al. | Mar. 27, 1951 |
| 2,609,063 | Francis | Sept. 2, 1952 |
| 2,618,548 | Drake | Nov. 18, 1952 |
| 2,621,754 | Doyle | Dec. 16, 1952 |

FOREIGN PATENTS

| | | |
|---|---|---|
| 2,287 | Sweden | July 31, 1889 |
| 19,753 | Sweden | Sept. 17, 1904 |